This invention relates to apparatus and methods for filling cake pans with charges of cake batter having laminated therein streams of flavor material.

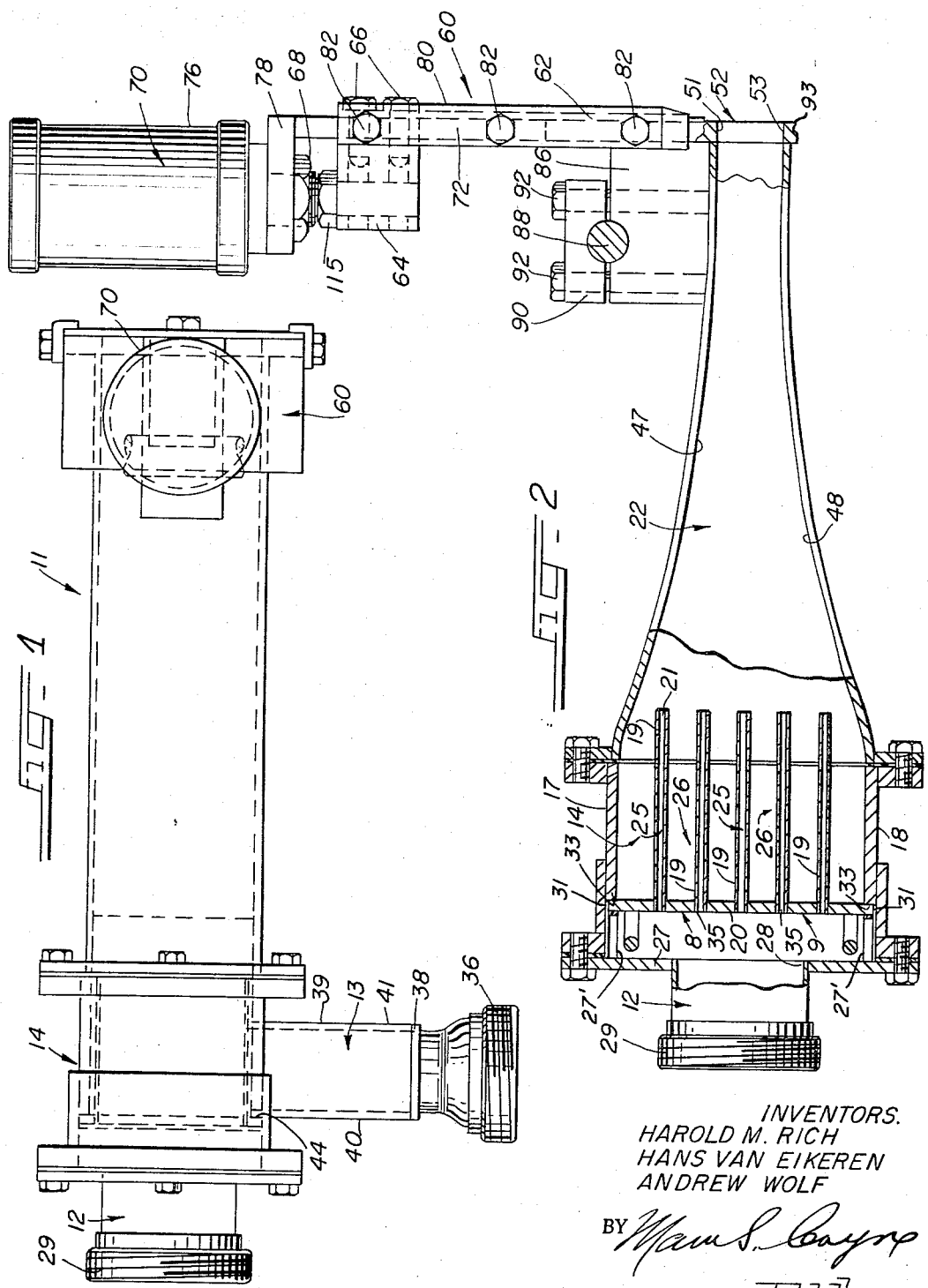

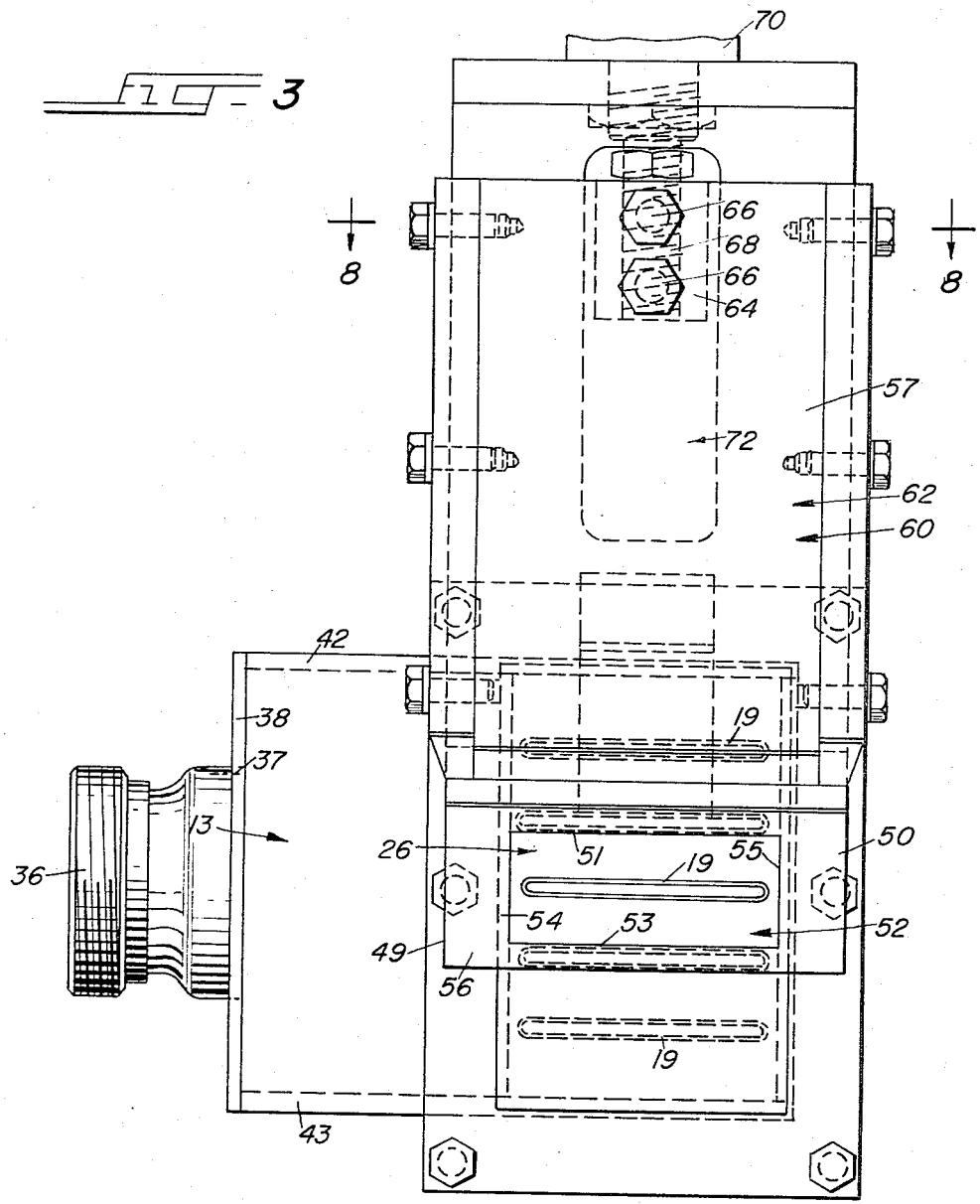
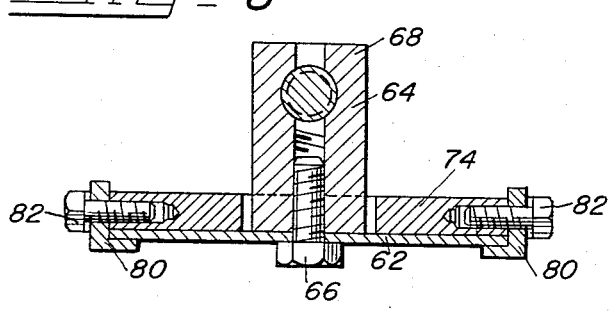

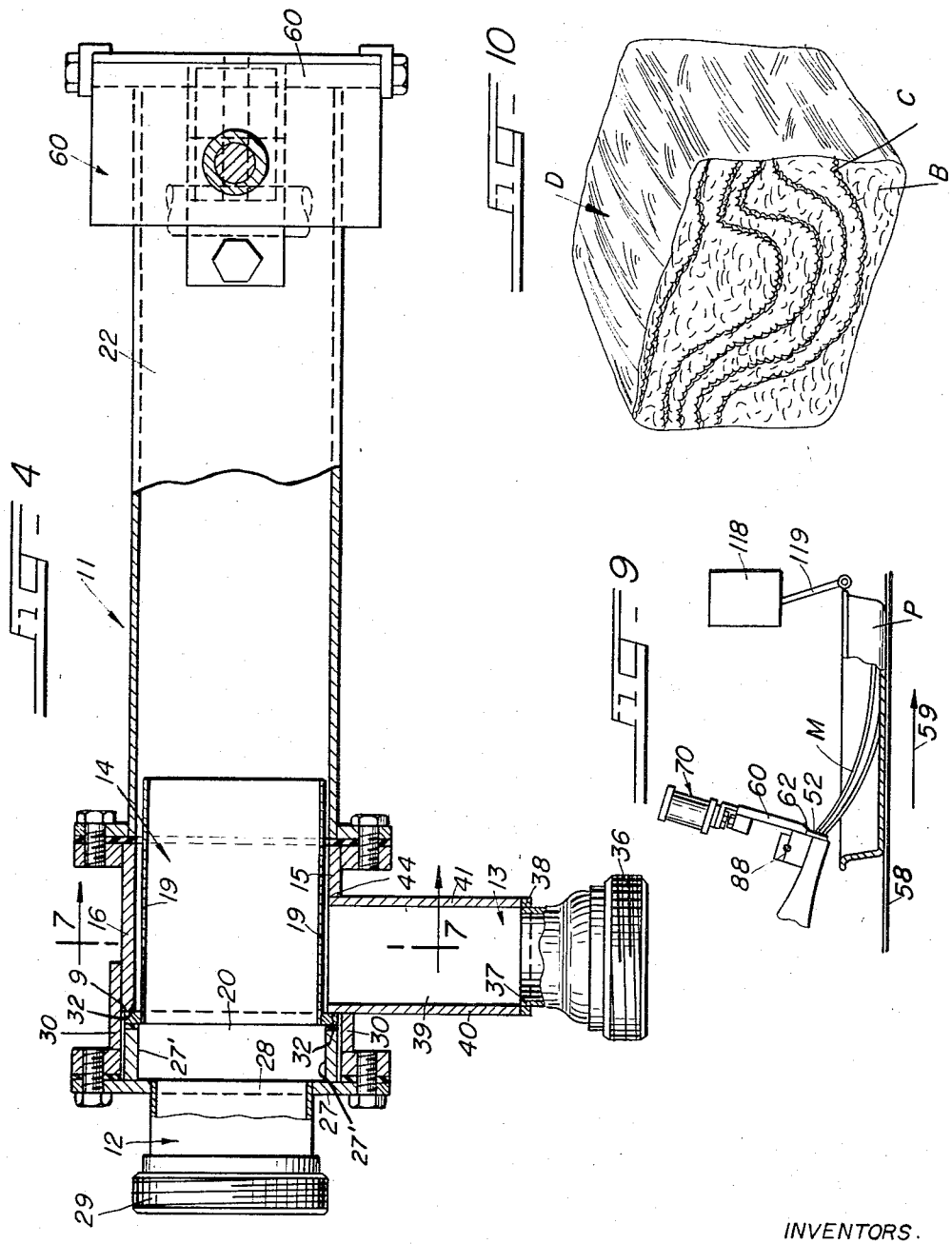

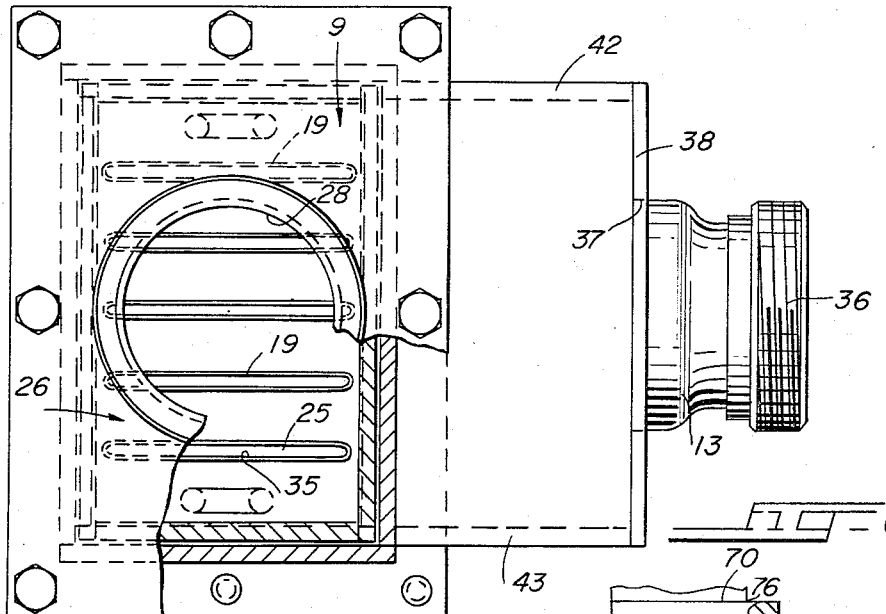
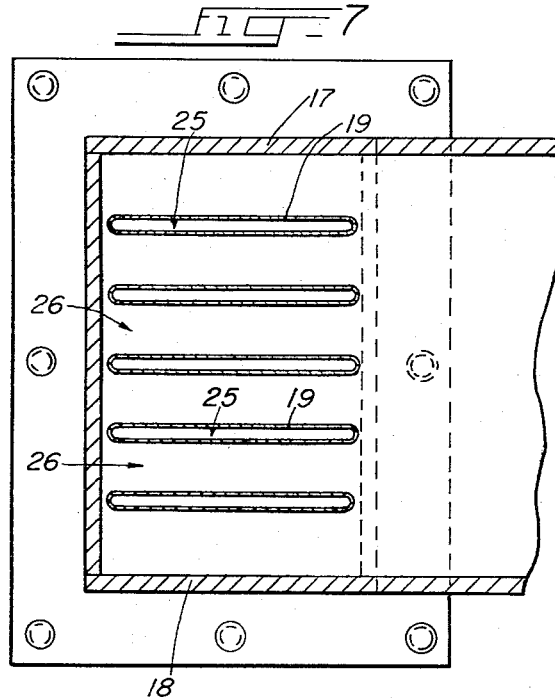
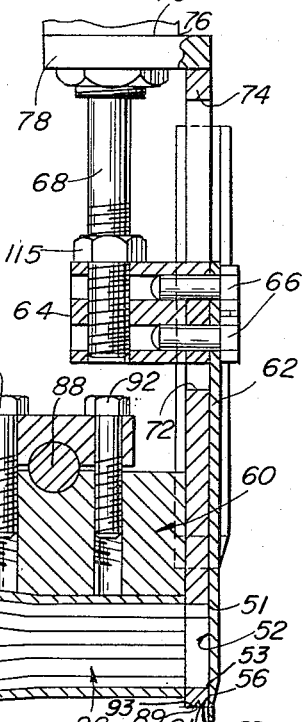
INVENTORS.
HAROLD M. RICH
HANS VAN EIKEREN
BY ANDREW WOLF 3,370,553
SWIRL CAKE
Harold M. Rich, Northbrook, Hans Van Eikeren, Lincolnwood, and Andrew Wolf, Deerfield, Ill., assignors to Kitchens of Sara Lee, Inc., Chicago, Ill., a corporation of Maryland
Filed Nov. 9, 1964, Ser. No. 409,733
5 Claims. (Cl. 107—1)

The present invention is specially suited for use in the manufacture of a form of cake known as "chocolate-swirl." This type of cake when baked comprises a plain sponge-like interior having dispersed therethrough a plurality of layers of chocolate. These layers are curved and undulate as they extend from one longitudinal edge of the cake to the opposite edge and are known as "swirls." The present invention laminates the chocolate in the form of layers within the cake batter, segments the batter into individual charges, and then places the charges within the cake pans where the chocolate-batter layers are baked to form the finished product. During baking, convection currents in the cake itself raise the laminar chocolate-batter layers to move to produce in the final baked cake the described swirl arrangement.

The preferred embodiment of the invention, disclosed herein as illustrative of one of the many forms which the invention may take in practice, comprises a laminating head for laminating the chocolate in the form of layers extending throughout the interior of the charge of batter. This laminating head is provided with a chocolate inlet conduit, a batter inlet conduit, a flow conduit, and an elongated laminating conduit. A plurality of equally-spaced oblong tubes extend longitudinally through the flow conduit to partition the interior of the latter into spaced passageways. A chocolate baffle plate extends between the chocolate inlet conduit and one end of the flow conduit. This baffle plate is provided with openings therethrough communicating between the chocolate inlet conduit and one end of each of a first series of said passageways. The batter inlet conduit is directly connected to one end of each of a second series of said passageways as will be seen. The laminating head further comprises a laminating conduit having one end communicating with the other end of the two series of passageways, and the other end forming an outlet for the laminated chocolate-batter arrangement.

Viscous fluid chocolate is pumped into said chocolate inlet conduit under pressure and flows through said first series of passageways wherein the chocolate is stretched and thinned. Simultaneously therewith cake batter is fed under pressure into said batter inlet conduit and flows through said second series of passageways. When the chocolate and batter emerge from the passageways they enter the laminating conduit where they are guided and pressed together by the converging elongated walls of the laminating conduit. The laminated arrangement then flows outwardly of the head through an outlet opening and at predetermined periodic time intervals a cutting blade cuts off a prescribed length of the laminated arrangement so as to form an individual charge. A conveyor is provided for conveying cake pans in spaced succession below the outlet opening in timed synchronization with the cutting blade movement so as to receive the individual charges as the latter are severed from the flowing mass discharging from the outlet opening.

Although the preferred embodiment disclosed herein is particularly adapted for the manufacture of cake, it will be understood that other materials may be utilized instead.

The oblong tubes are preferably of substantially rectangular cross-section whereby the chocolate flowing therethrough is formed into planar layers extending substantially across the entire width of the interior of the mixing conduit. The first series of passageways are preferably in alternating relation to the second series of passageways with each passageway of the first series extending between two adjacent passageways of the second series so that the laminar arrangement discharged from the outlet opening comprises layers of chocolate alternating with layers of batter.

Other objects and advantages of the present invention are either inherent in the structure and method steps disclosed or will become apparent to those skilled in the art as the detailed description proceeds in connection with the accompanying drawings wherein:

FIG. 1 is a top plan view of a preferred embodiment of apparatus in accordance with the present invention;

FIG. 2 is a side elevational view of the apparatus, partially broken away and in section;

FIG. 3 is an end elevational view as seen looking toward the mixture outlet opening;

FIG. 4 is a partially broken away and in section top plan view of the apparatus illustrated in FIG. 1;

FIG. 5 is a partially cut-away end elevational view as seen looking toward the chocolate conduit inlet;

FIG. 6 is an enlarged sectional view of the cutting blade and the mixture outlet opening;

FIG. 7 is a view taken along the line 7—7 in FIG. 4;

FIG. 8 is a view taken along the line 8—8 in FIG. 3;

FIG. 9 shows the chocolate-batter mixture flowing from the mixing head outlet opening and into a cake pan as the latter is conveyed beneath the outlet opening by a conveyor; and FIG. 10 is a perspective view of a baked chocolate-swirl cake cut away to show the chocolate swirl layers extending through the interior thereof.

Referring to the drawings in more detail, the reference numeral 11 indicates generally a laminating head having a chocolate inlet conduit 12 and a batter inlet conduit 13 joined to and communicating with one end of a flow conduit 14. The latter comprises a pair of spaced parallel vertical side walls 15, 16 joined along their upper edges to a top wall 17 and along their lower edges to a bottom wall 18.

The interior of flow conduit 14 is divided into a plurality of horizontally extending passageways by a series of vertically spaced horizontal oblong tubes 19 each substantially rectangular in outline and cross-section and attached to and extending from one transverse edge 20 secured in the chocolate baffle plate 9 positioned adjacent the inlet conduits 12, 13 to its opposite transverse edge 21 located in the elongated laminating conduit indicated generally at 22.

It will be noted that the vertical spacing between the oblong tubes 19 is such as to provide a first series of relatively thin passageways 25 alternating with and extending between a second series of relatively thick passageways 26, the thickness dimension involved being measured in the vertical direction. Cake batter is supplied to and flows through thick passageways 26 and viscous fluid chocolate is supplied to and flows through thin passageways 25, in a manner now to be described.

Referring particularly to FIG. 4, the left hand end of flow conduit 14 is closed by an end plate 27 having therein a circular opening 28 receiving one end of the hollow cylindrical chocolate inlet conduit 12. The opposite end of the latter is provided with a flange 29 for connection to the chocolate supply pipe (not shown). A reduced dimension perimetric abutment flange 27' projects from the opposite side of the end plate 27 and is adapted to fit within the flow conduit 14 as shown in FIGS. 2 and 4.

The flow conduit 14 is connected to the laminating conduit 22 and end plate 27 by any suitable means to provide an airtight seal between these members. Thus, in the embodiment illustrated, a circumferential collar is welded to the conduit 22 at its proximal end and this collar is bolted to a mating collar welded to the cooperating end of the flow conduit 14. Similarly, a second circumferential collar is welded to the flow conduit 14 at its opposite end, and the latter collar is bolted to the end plate 27 which is formed with aligned bolt-receiving openings. Suitable gaskets are of course sandwiched between the described members to provide airtight connections.

Vertical side walls 15, 16 of flow conduit 14 are offset at 30 and the top and bottom walls 17 and 18 are offset at 31 to provide inwardly extending vertical shoulders 32 and 33 respectively which cooperate with the abutment flange 27' retain the lateral edges of the chocolate baffle plate 9 which extends in a vertical plane and has rigidly connected thereto the oblong tubes 19. The oblong tubes 19 extend through the chocolate baffle plate 9 as can be seen in FIG. 2. The chocolate inlet conduit 12 communicates with the thin passageways 25 in the oblong tubes 19 in the chocolate baffle plate 9 through openings 35 but is prevented from communicating with thick passageways 26 by the portions 8 of the chocolate baffle plate 9.

Batter inlet conduit 13 comprises a flange 36 at its outer end for connection to a batter supply pipe (not shown) and its opposite end is fitted within a circular opening 37 formed in a rectangular plate 38 secured to the outer end of a rectangular duct 39. The latter is secured to side wall 15 of flow conduit 14 and comprises a pair of vertical side walls 40, 41 joined along their upper edges to a horizontal top wall 42 and along their lower edges to a horizontal bottom wall 43. The inner ends of walls 40, 41, 42, 43 of duct 39 are received within a rectangular opening 44 formed in flow conduit side wall 15 and abut the top and bottom walls 17 and 18 of said conduit.

It will thus be seen that cake batter supplied to batter inlet conduit 13 under pressure is forced through duct 39 and opening 44 into thick passageways 26 at the left-hand end of flow conduit 14 and flows through said thick passageways 26 to the right as viewed in FIG. 2 toward the laminating conduit 22.

Simultaneously with the flow of cake better through passageways 26, the viscous fluid chocolate supplied under pressure to chocolate inlet conduit 12 flows through openings 35 in the chocolate baffle plate 9 and passes through thin passageways 25 to the right toward laminating conduit 22. The chocolate is stretched and thinned as it passes through passageways 25 so as to form relatively thin planar layers extending between and alternating with the relatively thick layers of cake batter flowing through thick passageways 26.

Laminating conduit 22 is hollow and has a downwardly inclined hyperbolic type internal top wall or surface 47 (FIG. 2), an upwardly inclined hyperbolic type internal bottom wall of surface 48, and a pair of vertical side walls or surfaces 49, 50 (FIG. 3). The conduit 22 thus comprises a tubular member of rectangular cross-section, and in the embodiment illustrated, the walls 47, 48, 49 and 50 are integrally formed to provide said member. Top surface 47 terminates in a horizontally extending edge 51 defining the upper edge of a substantially rectangular outlet opening 52 which is further defined by the edge 53 of bottom surface 48 and the outer edges 54, 55 of lateral surfaces 49, 50 respectively. Mixture outlet opening 52 lies in the plane of a vertical end face 56 of laminating conduit 22. End face 56 is substantially smooth and planar so as to act as a bearing surface for a vertically reciprocating cutting blade 62, in a manner to be described below.

As the chocolate and batter emerge from the right-hand ends of passageways 25, 26 respectively at the edges 21 of tubes 19, they enter laminating conduit 22 and flow therethrough to outlet opening 52. The internal cross-sectional area of conduit 22 decreases in the direction toward mixture outlet 52 due to the convergence of top wall 47 with respect to bottom wall 48, thereby compressing the chocolate and batter together so as to join the layers of chocolate with the alternating layers of batter and thereby form a unitary mass having relatively thick laminar layers of batter with relatively thin laminar layers of chocolate therebetween.

The chocolate batter mixture mass flows continuously out through outlet opening 52 and at predetermined periodic intervals cutting blade 62 is moved downwardly to sever a predetermined length of the flowing mass so as to form an individual mixture charge M which is deposited within a cake pan P (FIG. 9) as the latter is conveyed on a conveyor belt 58 in the direction indicated by the arrow 59.

Positioned at the right hand end of the laminating conduit 22 is the cutter assembly 60 which comprises a reciprocating blade element 62 secured to a slidable block 64 by a pair of machine screws 66. The blade block 64 is threadedly secured to reciprocating shaft 68 which in turn is periodically reciprocated by air motor 70 which can be of any known type. The blade block 64 reciprocates in a slot 72 provided in guide plate 74. The guide plate 74 is rigidly secured to the air cylinder 76 of the air motor 70 through a linkage 78. A pair of L-shaped guide arms 80, best illustrated in FIG. 8, are secured to the guide plate 74 by a plurality of machine screws 82 and guide the reciprocating motion of the blade element 62. The guide plate 74 is rigidly attached to block 86 by welding or any other means and the block 86 is secured to the laminating conduit 22 by any means such as welding or the like. The entire laminating head can be mounted on rod 88 and secured thereto by bearing head 90 and a plurality of machine screws 92 which extend into block 86 connected as illustrated in FIG. 2.

Referring to FIG. 6, laminating conduit 22 is provided with an angularly inclined surface 87 extending from end face 56 to an oppositely inclined surface 89 so as to form therewith a V-shaped recess 91. Surface 87 together with end face 56 form a relatively sharp edge 93 which is periodically swept by cutting blade 62 as the latter moves downwardly toward its lowermost position indicated in FIG. 6. Recess 91 provides a clearance enabling end face 56 to be cleared of chocolate-batter mixture by blade 62 so as to prevent adherence and piling up of the mixture on end face 56.

Blade 62 is reciprocated by an air motor indicated generally at 70 and comprising an air cylinder 76 secured to the linkage 78 as previously described. Within air cylinder 76 is the usual reciprocating piston (not shown) to which is secured a threaded reciprocating shaft 68 engaging within a threaded opening formed in a block 64 and maintained in assembled relation thereto by a lock nut 115. Block 64 is connected to cutting blade 62 by a pair of machine screws 66 are previously stated. It will thus be seen that reciprocating of the piston within air cylinder 76 causes reciprocal sliding movement of blade 62 due to the force transmitted thereto through shaft 68, block 64 and machine screws 66.

Referring to FIG. 9, there is shown schematically an arrangement for synchronizing the cutting action of blade 62 with the passage of a cake pan P beneath mixture outlet 52 whereby the severed charge of mixture M may drop in properly timed relation with the passage of pan P therebeneath. The synchronizing arrangement comprises a switch 118 having an arm 119 engaged and actuated by contact with a pan P as the latter is carried along by conveyor 58. Actuation of switch 118 causes activation of air motor 70 by any conventional control mechanism for the latter. It will thus be seen that as conveyor 58 carries a series of cake pans P in succession below the laminating head 11, each pan P will be filled with an individual charge of mixture M comprising a unitary mass of cake batter in the form of thick layers having interspersed therebetween relatively thin laminar layers of chocolate.

After baking, the finished cake product is as shown cut away and indicated generally by the reference letter D in FIG. 10 and comprises a swirl configuration of the chocolate layers indicated at C with the batter layers therebetween indicated at B. The swirl configuration of the chocolate layers as shown in FIG. 10, is believed to be formed during the baking of the cake because of the difference in the density and viscosity of the batter and the flavoring material.

The specific directional orientation of the cake layers may be altered as desired by adjusting the angle of the laminating head 11 with relation to the pans P.

It is to be understood that the specific embodiment shown in the drawings and described in detail above is merely illustrative of one of the many forms which the invention may take in practice without departing from the scope of the invention as delineated in the appended claims which are to be construed as broadly as permitted by the prior art.

We claim:

1. An apparatus for filling cake pans with a laminated charge of batter having chocolate layers therein,
    said apparatus comprising a laminating head having a chocolate inlet conduit,
    a batter inlet conduit,
    an elongated flow conduit,
    said flow conduit having positioned therein two series of spaced longitudinally elongated passageways,
    a first baffle plate extending between said chocolate inlet conduit and one end of said flow conduit and having openings therethrough communicating between said cholocate inlet conduit and one end of each of a first series of said passageways,
    a laminating conduit having one end communicating with said two series of passageways and the other end of said laminating conduit providing an outlet opening,
    whereby viscous fluid chocolate is stretched and thinned as it passes through said first series of passageways and is laminated with batter passing through said laminating conduit,
    said first series of passageways being in alternating relation to said second series of passageways with each predetermined time intervals to form individual adjacent passageways of said second series,
    whereby the mixture discharged from said outlet opening comprises layers of chocolate laminated with layers of batter, and
    means for periodically cutting said laminated charge at predetermined time intervals to form individual charges therefrom as the laminated charge flows from said outlet opening.

2. An apparatus as recited in claim 1 and further including conveyor means for conveying cake pans in spaced succession adjacent said outlet openings to receive said laminated individual charges.

3. An apparatus as recited in claim 2 wherein said cutting means comprises a cutting blade,
    means mounting said blade for reciprocal sliding movement adjacent said outlet opening,
    and drive means for reciprocating said blade.

4. An apparatus as recited in claim 3 and further including conveyor means for conveying cake pans in spaced succession below said outlet opening in timed synchronization with said blade movement to receive said individual charges.

5. A method of filling cake pans with laminated layers of flavor material and batter,
    said method comprising the steps of flowing cake batter in the form of a plurality of thick layers,
    flowing flavor material in the form of a plurality of thin layers,
    placing each of the layers of flavor material between a pair of layers of batter so as to form a superimposed series of alternating layers of batter and flavor material,
    compressing the superimposed layers to form a unitary mass thereof,
    flowing said unitary mass continuously, periodically cutting said flowing mass at predetermined time intevals to form individual charges therefrom,
    passing a succession of cake pans in timed synchronization with said cutting step,
    and placing each of said individual charges within a respective one of said passing cake pans.

References Cited

UNITED STATES PATENTS

| | | | |
|---|---|---|---|
| 2,334,052 | 11/1943 | Wedin | 107—1 X |
| 2,858,217 | 10/1958 | Benson | 107—1 X |
| 3,196,810 | 7/1965 | Roth | 107—7 X |
| 3,213,808 | 10/1965 | Schafer | 107—54 X |

WALTER A. SCHEEL, *Primary Examiner.*

J. SHEA, *Assistant Examiner.*